United States Patent [19]
Green et al.

[11] Patent Number: 5,566,973
[45] Date of Patent: *Oct. 22, 1996

[54] ADVANCED PASSENGER INFLATOR WITH SLIDE IN ATTACHMENT TO EXTRUDED MODULE

[75] Inventors: David J. Green, Brigham; Donald R. Lauritzen, Hyrum; S. Mark Bunker, Ogden; Larry D. Rose, Layton, all of Utah

[73] Assignee: Morton International, Inc., Chicago, Ill.

[ * ] Notice: The term of this patent shall not extend beyond the expiration date of Pat. No. 5,407,223.

[21] Appl. No.: 539,206

[22] Filed: Oct. 4, 1995

[51] Int. Cl.⁶ ..................................................... B60R 21/16
[52] U.S. Cl. .................... 280/728.2; 280/732; 280/741
[58] Field of Search .............................. 280/728.2, 732, 280/741, 743.1, 728.1, 736

[56] References Cited

U.S. PATENT DOCUMENTS

| | | | |
|---|---|---|---|
| 5,058,919 | 10/1991 | Paquette et al. | 280/732 |
| 5,074,584 | 12/1991 | Jarobe | 280/728.2 |
| 5,255,938 | 10/1993 | Brede et al. | 280/736 |
| 5,263,739 | 11/1993 | Webber et al. | 280/728 |
| 5,332,256 | 7/1994 | Lauritzen et al. | 280/728 A |
| 5,344,182 | 9/1994 | Lauritzen et al. | 280/728 A |
| 5,407,223 | 4/1995 | Lauritzen et al. | 280/728 A |
| 5,407,226 | 4/1995 | Lauritzen et al. | 280/728 R |
| 5,407,227 | 4/1995 | Lauritzen et al. | 280/728 R |
| 5,409,259 | 4/1995 | Cunningham et al. | 280/741 |
| 5,431,436 | 7/1995 | Mossi et al. | 280/728.1 |
| 5,468,012 | 11/1995 | Mihm | 280/728.2 |

FOREIGN PATENT DOCUMENTS

| | | | |
|---|---|---|---|
| 0160756 | 6/1989 | Japan | 280/728.2 |

*Primary Examiner*—Christopher P. Ellis
*Attorney, Agent, or Firm*—Gerald K. White

[57] ABSTRACT

The reaction canister of an airbag module assembly is extruded to include a semicircular floor, first and second sidewalls, and first and second end plates closing the ends of the canister, with the floor extending uniformly between the sidewalls, and a bottom edge of each sidewall defining a channel along its length. A cylindrical inflator chamber is suspended beneath the floor of the canister by opposed parallel wings which are integral with the inflator chamber and are insertable into and slide in the channels to a position wherein the walls of the channel are staked to the wings. A plenum chamber is formed between the curved wall of the inflator chamber and the floor of the reaction canister. The plenum chamber separates gas exit vent holes of the inflator chamber from gas inlet passages or vent holes in the canister floor. The plenum chamber is closed by the canister end plates which seal the plenum chamber by engaging the adjacent ends of the wings of the inflator chamber and the adjacent ends of the canister floor and of the channels. The module assembly requires only eight fasteners, that is, four on each end of the canister.

17 Claims, 8 Drawing Sheets

ADVANCED PASSENGER INFLATOR WITH SLIDE IN ATTACHMENT TO EXTRUDED MODULE

BACKGROUND OF THE INVENTION

1. Field of the Invention

The present invention relates to automotive vehicle passenger airbag modules and, more particularly, to the assembly of the reaction canister and the inflator chamber of such modules.

2. Description of the Prior Art

An automotive vehicle airbag module is a complete airbag unit that is assembled apart from the vehicle and then coupled, as a unit, to the vehicle. Typically, an airbag module includes a reaction canister, a folded airbag connected to the reaction canister and an inflator, that is, a device which produces an inflating gas and is connected to the reaction canister. A cover connected to the reaction canister is provided to complete an enclosure for the folded airbag.

The airbag module is generally coupled with a structural part of the vehicle by the reaction canister. A passenger side airbag module typically is coupled with the support structure for the vehicle dashboard, with the cover of the module forming a part of the dashboard.

New and more cost effective techniques for manufacturing airbag modules are becoming increasingly important. Airbag modules are currently being installed in a large number of automotive vehicles. The number of airbag modules installed in the future is expected to continue to increase. There is, therefore, a need for simple and effective techniques that would have a minimal effect on current assembly lines to enable automotive vehicle manufacturers to meet this growing demand.

Passenger side airbag modules typically are rectangular in shape. This is to house a larger airbag that is capable of protecting either two passengers or a single passenger who is out of an ideal position. Inflators have been developed at a faster pace than reaction canisters and airbags or cushions. This has resulted in a number of problems in assembling the components. Thus, there has developed, in this connection, a need and a demand for truly satisfactory solutions. Solutions that have been proposed and employed have resulted in awkward assembly and increased weight and cost. By way of example, current modules utilize either a pyro or a hybrid inflator and a module housing that is either extruded, deep drawn or a folded can. These current configurations require the inflator to be positioned inside the reaction canister and usually require fasteners to hold it in place. Current modules incorporate usually between 12–20 fasteners in the assembly.

SUMMARY OF THE INVENTION

An object of the invention is to provide an automotive passenger inflator and airbag module extrusion that provides a simple and easy way to attach an inflator to a module without any fasteners.

Another object of the invention is to provide such an automotive passenger inflator and module extrusion wherein the inflator slides into a module and is "staked" into the module.

Other objects, features and advantages will become apparent from the following description and appended claims.

In accomplishing these and other objectives of the invention, there is provided a passenger side airbag module housing including a reaction canister that includes an extruded trough having sidewalls and a floor. Each bottom edge of the reaction canister sidewalls defines a channel. An extruded cylindrical or tubular inflator chamber carries opposed wings or rectangular rails which are insertable in channels of the reaction canister. The inflator chamber wings slide into the channels of the reaction canister. The inflator chamber is then staked into the module.

The top surface of the curved sidewall of the inflator chamber is spaced below the floor of the reaction canister. The floor of the reaction canister has a substantially semicircular portion that extends uniformly into the space between the sidewalls. A plenum chamber is formed between the floor of the reaction chamber and the top surface of the inflator chamber. The plenum chamber separates openings in the inflator chamber from gas exit passages on the canister floor.

The plenum chamber is closed by a pair of reaction canister end plates. The end plates include spaced screw hole projections that are aligned with the ends of respectively spaced tubular projections on the ends of the reaction canister. The end plates are secured by screws that are threaded into the tubular projections. In one embodiment, these screws are self tapping and have heads that break off at a predetermined torque to provide a tamper resistant rivet type head.

The head and the aft ends of the inflator chamber, are both closed by roll crimping. In one embodiment of the invention, each of the ends of the inflator chamber extends to or slightly beyond a respectively associated end of the reaction chamber.

The openings in the inflator chamber and the passages in the floor of the reaction canister permit the passage of inflating gas into an airbag or cushion contained within the module housing.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification, and of which.

BRIEF DESCRIPTION OF THE PREFERRED EMBODIMENT

Figure 1:
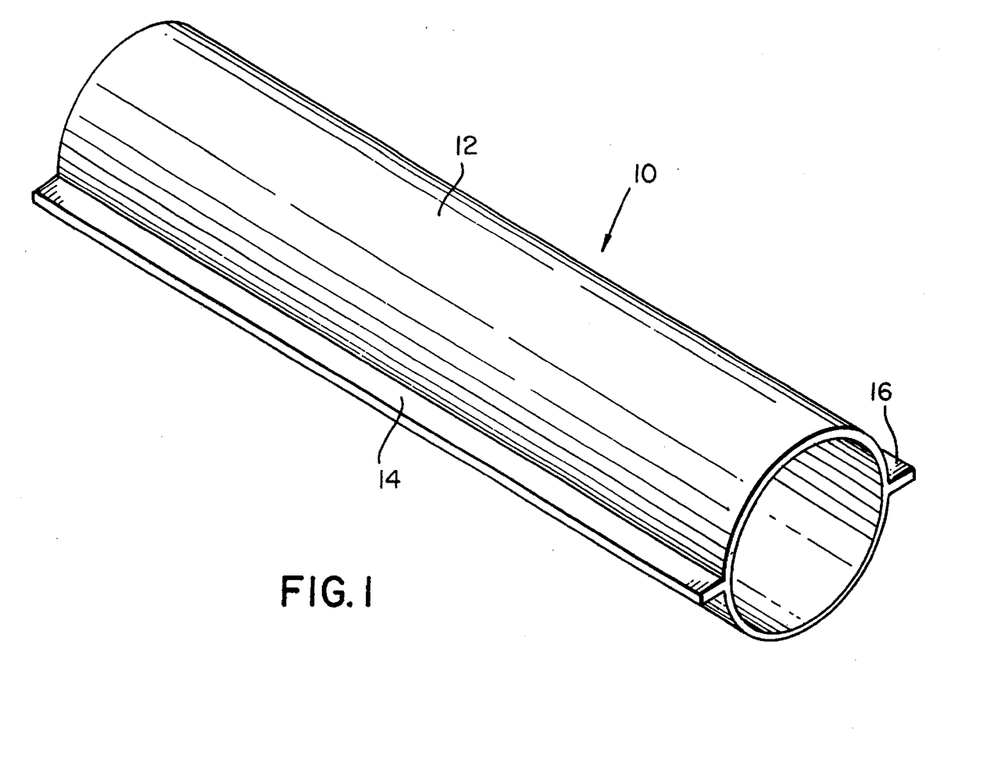
FIG. 1 is a perspective view of a cylindrical or tubular extruded tube for an inflator chamber that is cut to length and has opposed parallel wings or rails extending along the full length thereof.
Figure 1A:
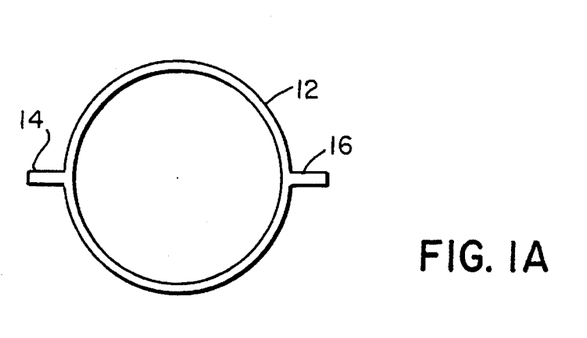
FIG. 1A is an end view of the cylindrical or tubular tube of FIG. 1.

Referring to the drawings there is illustrated in FIGS. 1 and 1A a tubular extruded tube for an inflator chamber 10. The inflator chamber 10 comprises tubing 12, having opposed parallel rectangular projections or wings 14 and 16, that are extruded and cut to length. The tubing 12 is an extrusion of constant cross section made of a desired suitable material such as aluminum that is extrudable using standard extrusion techniques.

Figure 2:
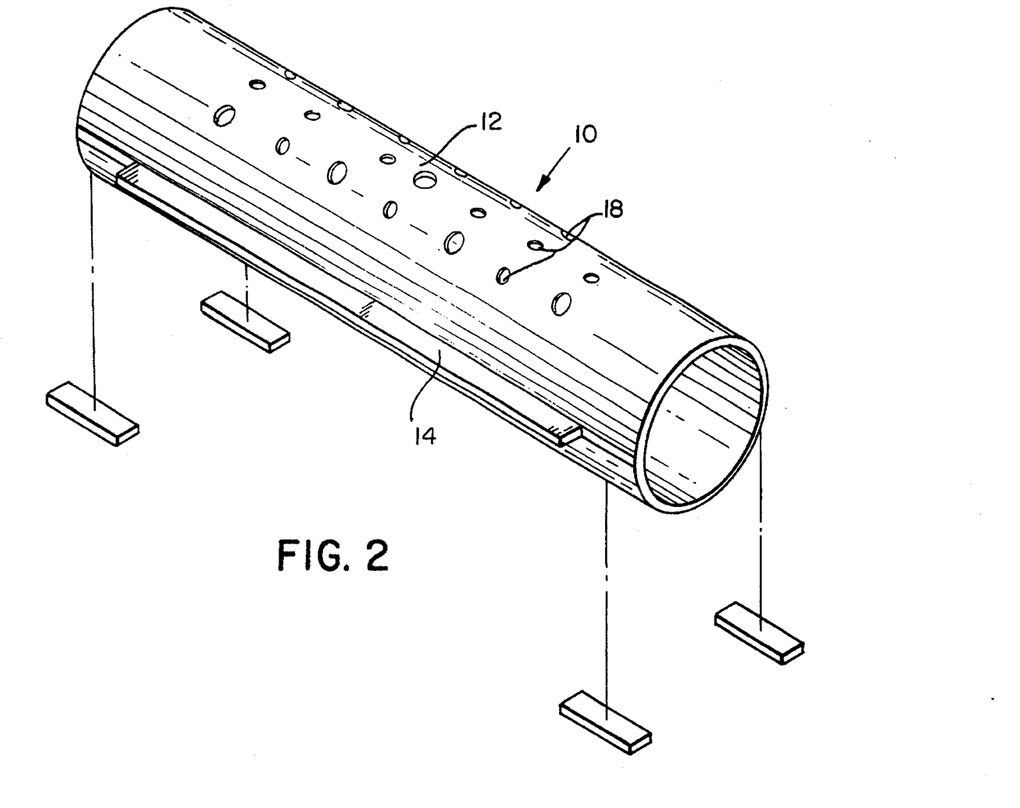
FIG. 2 is an exploded perspective view of the cylindrical extruded inflator chamber according to the invention showing-porting or vent holes punched out and the wings partially sheared off adjacent each end.

The inflator chamber 10 has inflation gas vent or port holes 18 punched out and the wings 14 and 16 sheared off, as shown in FIG. 2, using a conventional die/punch assembly.

Figure 3:
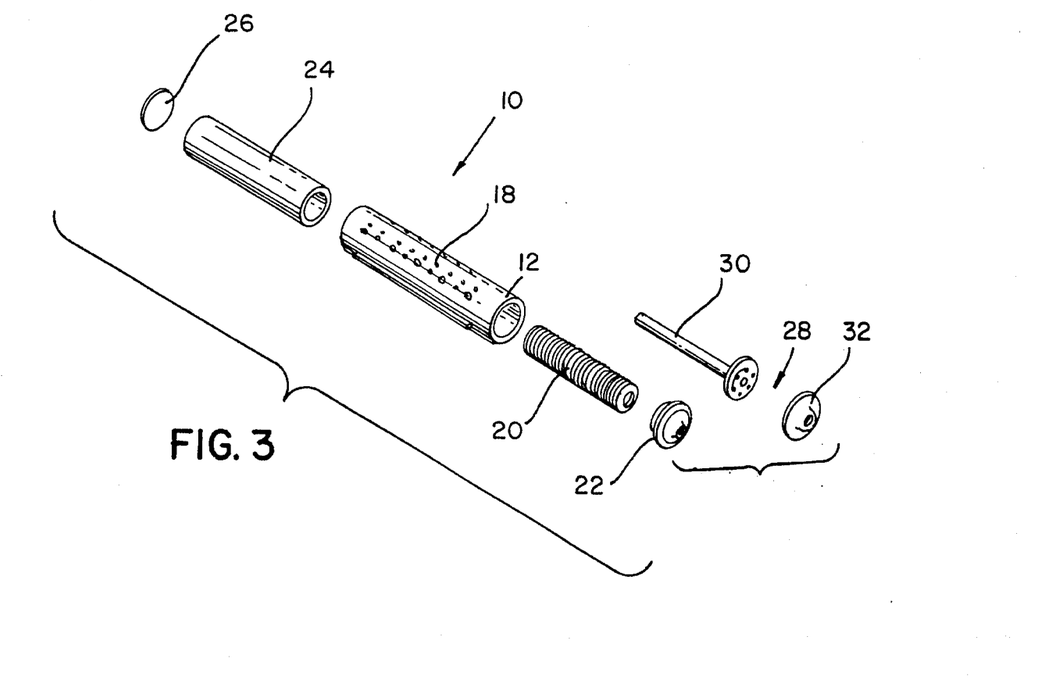
FIG. 3 is an exploded perspective view of an extruded current automotive passenger inflator with the exception of the provision of a second roll crimp on the aft end.

As shown in FIG. 3, the inflator chamber 10 is loaded with a charge of gas generant material 20, a basket type igniter 22, a filter 24, and an aft closure 26. Such a construction is illustrated in U.S. Pat. No. 5,409,259, which patent was granted on Apr. 25, 1995 to Donald J. Cunningham and is assigned to the same assignee of the present invention. In an alternative inflator chamber 10 version which also is shown in FIG. 3, there is provided an alternate linear type igniter 28 having an elongated stem 30 that extends through a gas generant material 20, and a closure 32 for the alternate igniter 28.

Figure 4:
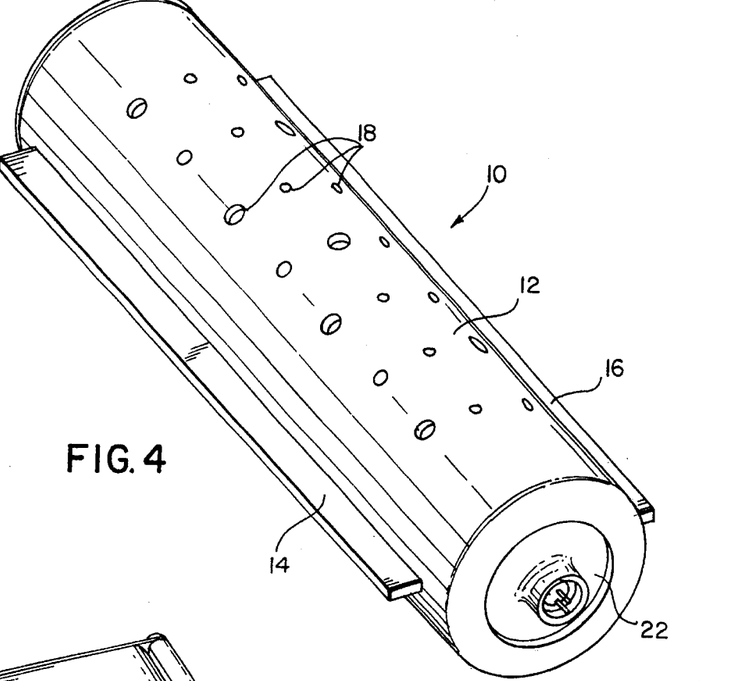
FIG. 4 is a perspective view of the inflator that is shown in exploded view in FIG. 3, with both ends closed by roll crimping.

The inflator chamber 10 is loaded the same way as current automotive passenger inflators, such as that disclosed in the aforesaid U.S. Pat. No. 5,409,259, with the exception, as indicated in FIGS. 3 and 4, of a second roll crimp on the aft end of the inflator. This can be done using current automotive passenger inflator manufacturing lines with minimal modifications. These modifications would require the addition of one roll crimping machine at the head end of the assembly line. Inflators according to the invention can be built to any length of charge load, as required.

Figures 5, 5A:
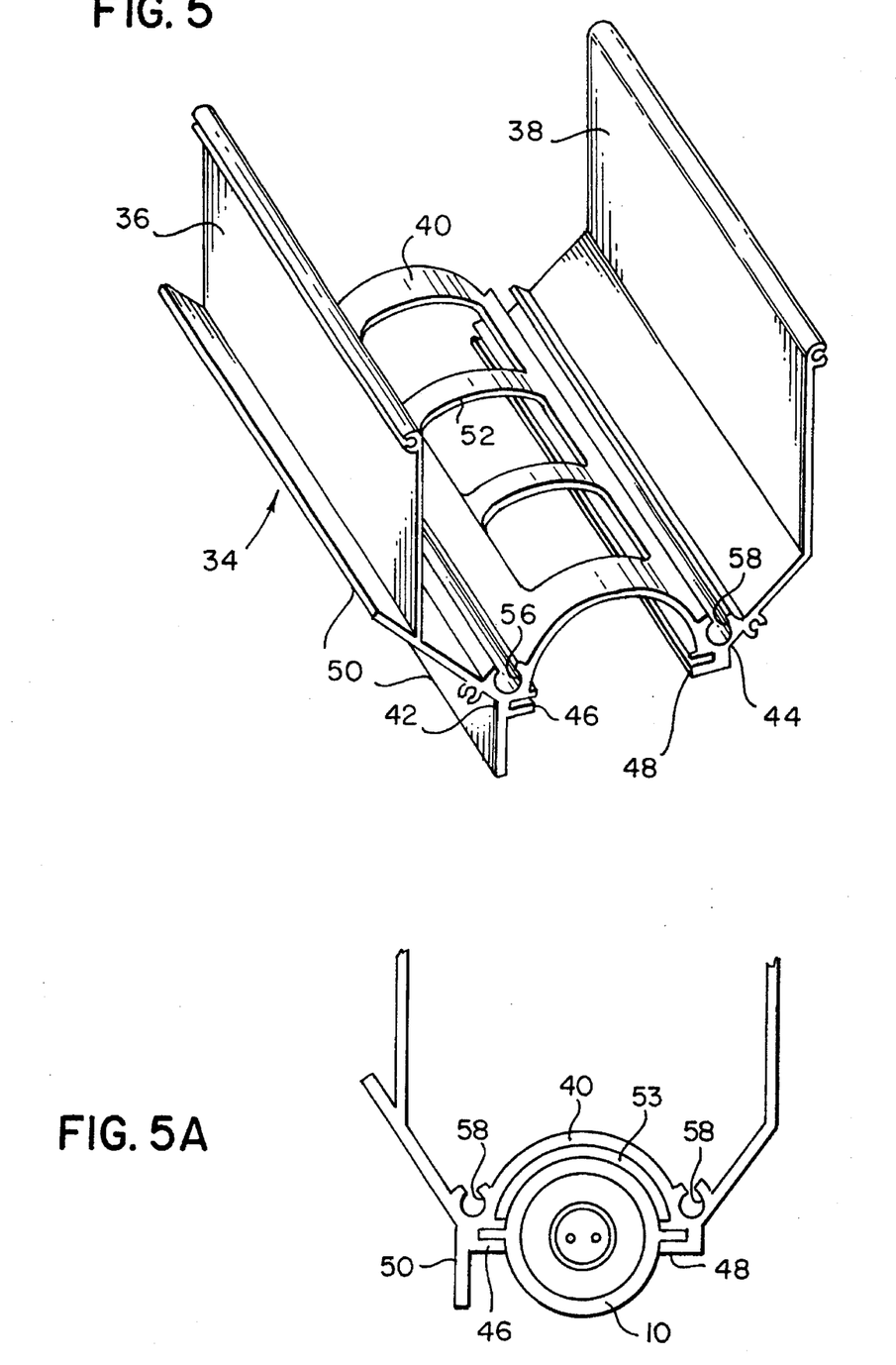
FIG. 5 is an isometric view of an extruded reaction canister according to the invention.
FIG. 5A is a fragmentary view illustrating the assembly of the inflator in the reaction canister.

There is illustrated in FIG. 5 a module housing, more specifically, a reaction canister 34 which is an extrusion of constant cross section made of a desired, suitable material such as, for example, aluminum. The canister 34 includes sidewalls 36 and 38 that are joined by an inwardly, that is upwardly, curved semicircular floor 40 that extends between the sidewalls 36 and 38. The bottom edges 42 and 44 of the respectively associated sidewalls 36 and 38 extend below the level of the floor 40 and define respective parallel and substantially rectangular inflator slide in channels 46 and 48. These parallel, substantially rectangular channels 46 and 48 extend the length of the canister 34 on each side of the canister floor 40. The bottom edge 42 of the sidewall 36 extends further below the floor 40 than the slide in channel 46 to provide a module mounting flange 50. The canister floor 40, as shown in FIG. 5, includes three relatively large gas inlet passages 52 which are of substantially the same size and are spaced uniformly along the length of the reaction canister for permitting gas to flow into an airbag or cushion, as will be described.

When inserted in the reaction canister 34, as shown in FIG. 5A, the inflator chamber 10 is spaced from the semicircular portion of the canister floor 40 to form a plenum chamber 53. The plenum chamber 53 is formed intermediate the vent holes 18 that are provided in the inflator chamber 10 and the gas inlet passages 52 in the canister floor 40. The ends of the plenum chamber are closed by the end plates 68 and 70, as shown in FIG. 7.

Figure 6:
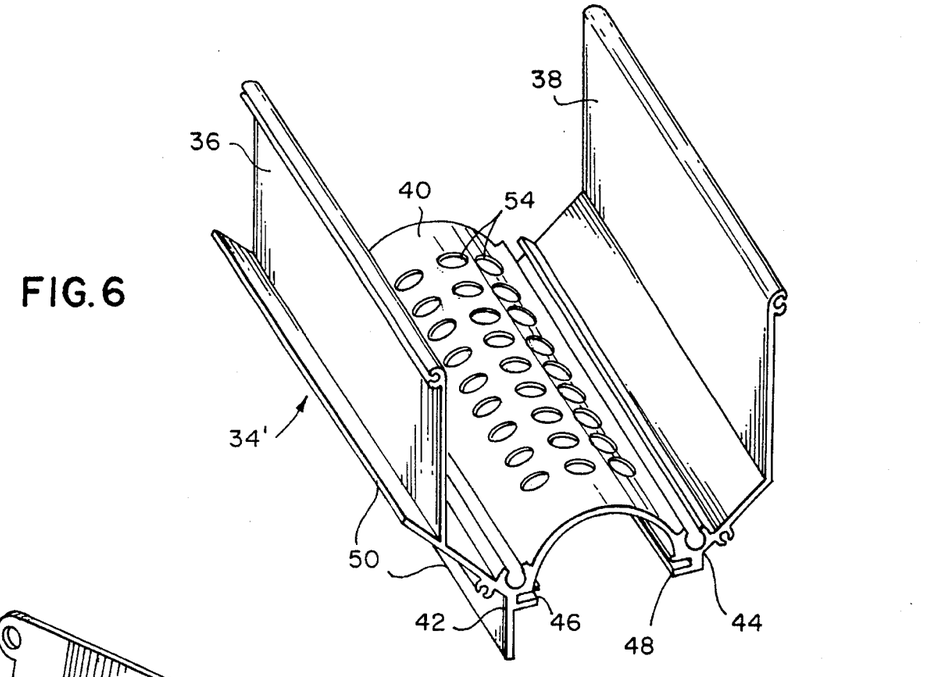
FIG. 6 is an isometric view of an alternate extruded reaction canister according to the invention.
Figure 7:
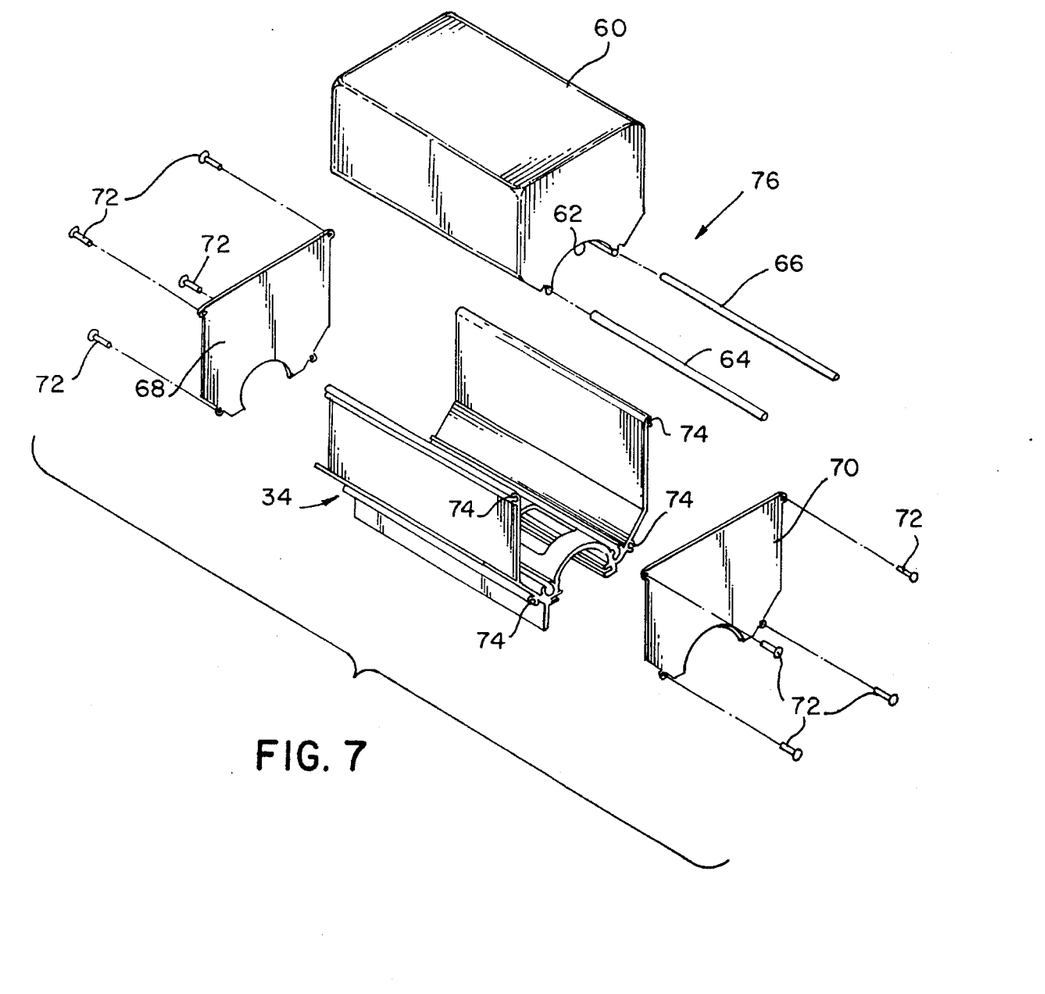
FIG. 7 is an exploded isometric view illustrating various components of the module including the extruded reaction canister, the module housing including end plates, a stored inflatable airbag or cushion, retaining rods, and fasteners for the module housing end plates.

In addition to the slide in channels 46 and 48 formed in the reaction canister 34 below the floor 40, there are also a pair of channels 56 and 58 formed above the surface of the floor 40, as shown in FIGS. 5, 6 and 7. These channels 56 and 58 may be used to secure the mouth 62 of an airbag or cushion 60 by means of rods 64 and 66, as shown in FIG. 7. Such a construction is disclosed more fully in U.S. Pat. No. 5,431,436 which was granted on Jul. 11, 1995 to Mosel et al. and assigned to the same assignee as the present invention. After attachment of the mouth 62 of the airbag 60 to the reaction canister 34, the ends of the reaction canister 34 are closed by end plates 68 and 70 secured by fasteners, specifically four screws 72 tapped into the ends of conventional tubular screw preparations 74 that are provided on each of the ends of the reaction canister 34.

An alternate module housing is illustrated in FIG. 6. This module housing, or more specifically reaction canister, identified by reference numeral 34', differs from the reaction canister 34, shown in FIG. 5, in that the floor 40 includes a multiplicity of gas inlet passages or vents 54 for permitting gas flow into an airbag. Each of the passages 54 is substantially smaller than the gas inlet passages 52 that are shown in FIG. 5.

The exploded view of the module housing shown in FIG. 7 is that prior to the installation of the inflator. The module, designated by numeral 76, includes the extruded reaction canister 34, end plates 68 and 70, the airbag 60 which is folded, airbag retaining rods 64 and 66, and fasteners 72 for attaching the end plates 68 and 70 to the reaction canister 34. The module assembly only requires eight fasteners 72, that is, four on each side.

Figure 8:
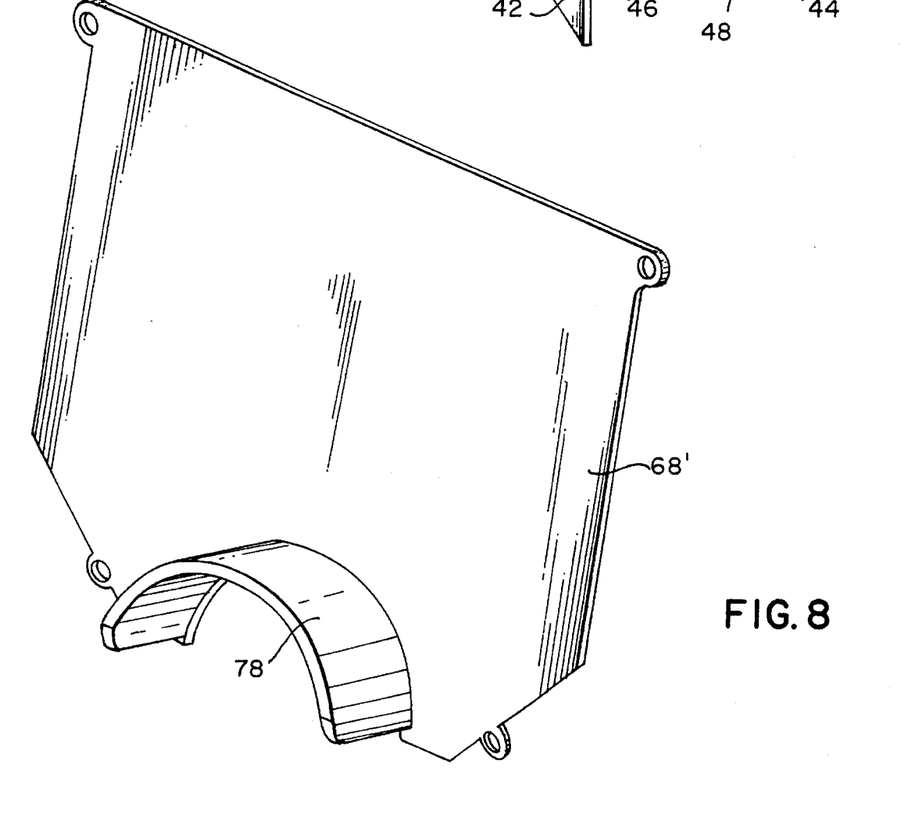
FIG. 8 is an isometric view of a module housing end plate with a cylindrical flange turned over that may be used to fill the gap between the module end plate and the end of the inflator in the event that a module is needed that is longer than the inflator.

In the event that a module 76 is needed that is longer than the inflator 10, an end plate 68' with a semicircular flange 78 formed thereon, as shown in FIG. 8, is usable to fill the gap between the module end plate 68' and the end of the inflator 10. This closes the gap left by the longer module, with the adjacent end of the plenum chamber 53 being sealed by the end of the flange 78.

Figure 9:
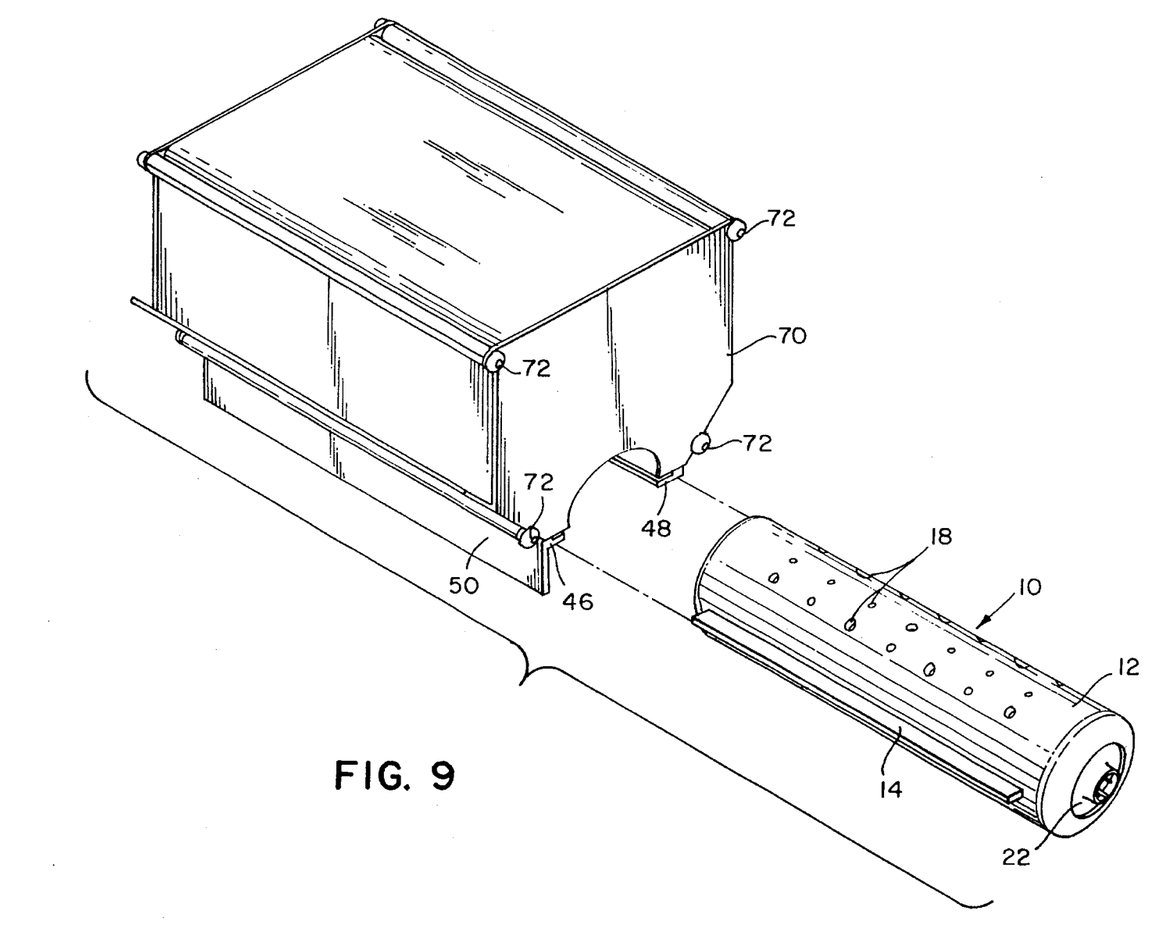
FIG. 9 is an isometric view illustrating how the inflator slides onto an extruded module.
Figure 10:
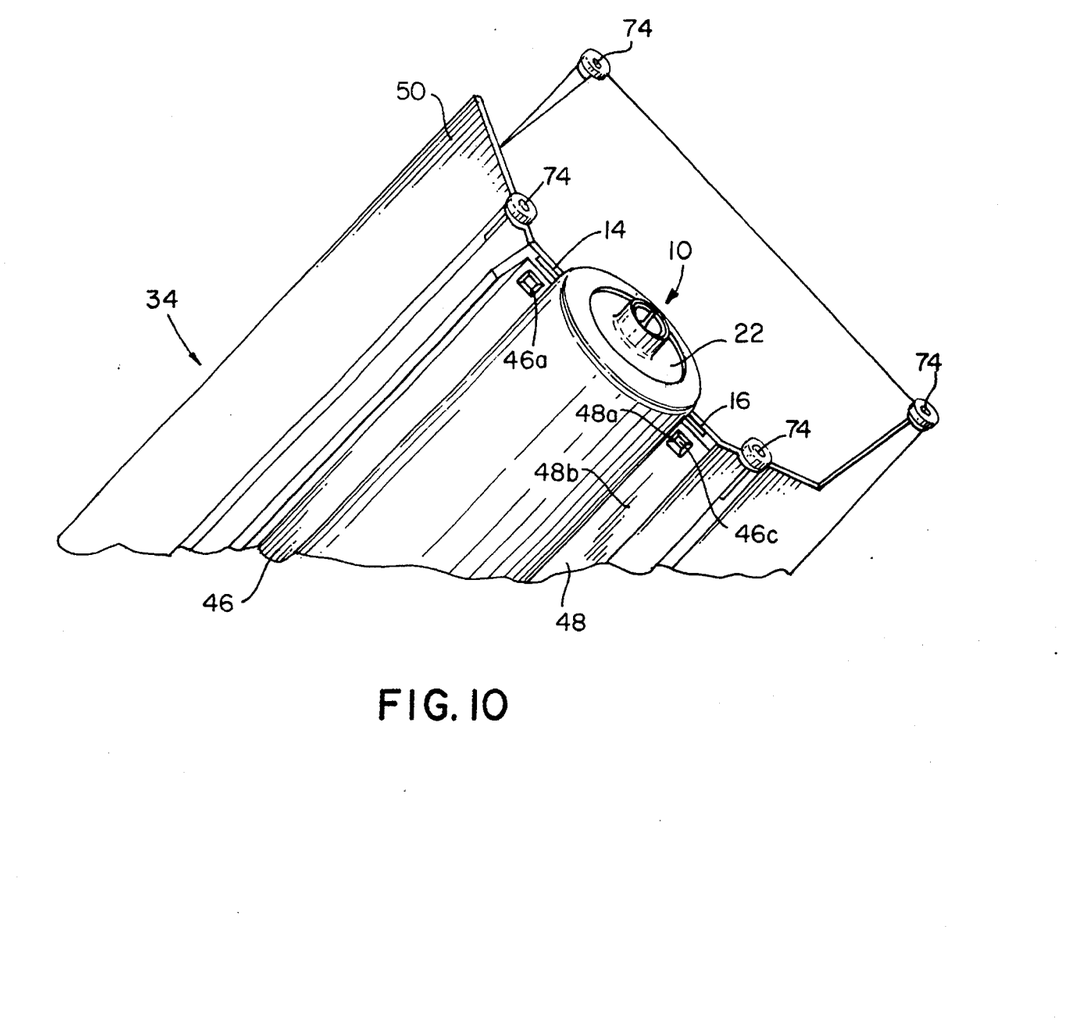
FIG. 10 is a fragmented isometric view of a lower portion of the extruded reaction canister showing the wings of the inflator chamber staked in place to the reaction canister adjacent one end of the inflator.
Figure 10A:
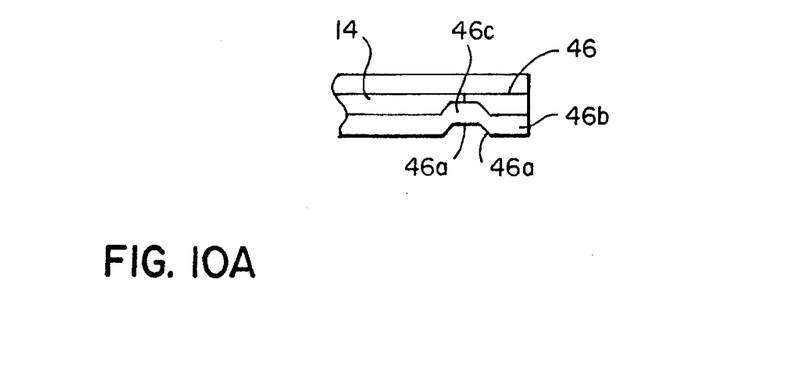
FIG. 10A is a fragmentary view that further illustrates the staking of the inflator channel to the reaction canister.
Figure 11:
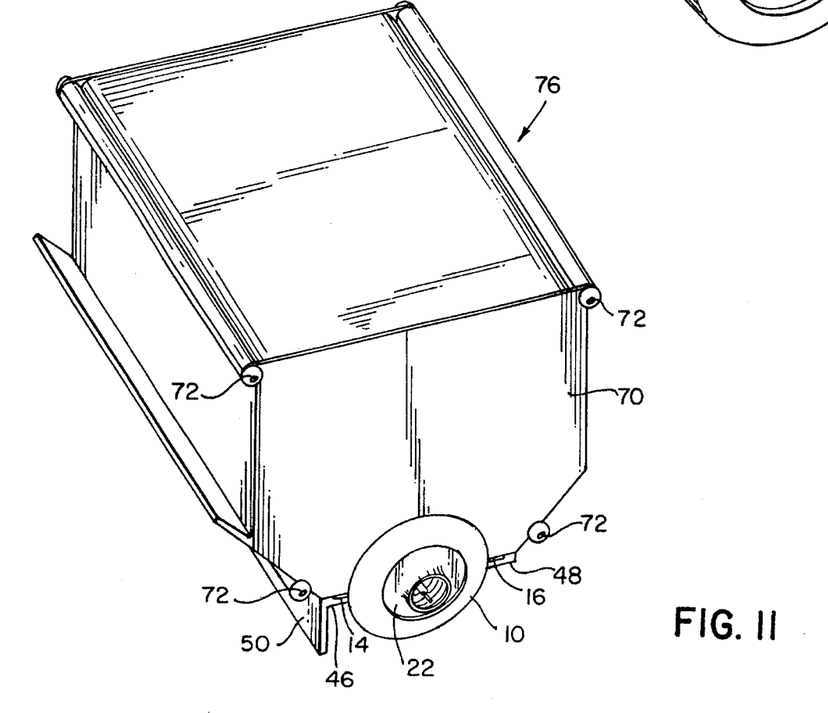
FIG. 11 is an isometric view of a completed module according to the invention.

The module 76 is lighter and easier to handle during the manufacturing process inasmuch as the inflator 10 is installed last. The inflator 10 slides onto an extruded module as shown in FIG. 9. Then, as shown in FIGS. 10 and 10A, the inflator 10 is crimped or "staked" in place by means of a projection 46c that is caused by a sunken space or cavity 46a that is produced in the wall 46b of the channel 46 and in the inflator chamber wing 14. Such crimping or staking may be effected in any suitable manner as, for example, by means of a crimping device that exerts a pressure on the wall 46b of channel 46 and compresses the inflator chamber wing 14 to form cavity 46a. This produces a stake 46c in the wall 46b of the reaction canister channel 46 adjacent the end of the inflator chamber wing 14. The stake 46c and a similar stake 48c produced by a cavity 48a in the wall 48b of the channel 48 of the reaction canister 34 locks the inflator channel 10 in place in the channels 46 and 48 of the reaction canister 34 of the module 76.

It is believed that the many advantages of this invention will be apparent to those skilled in the art. It will also be apparent that a number of variations and modifications may be made therein without departing from the spirit and scope. For example, it will be apparent that the module 76 could be extruded to any shape as required for any automotive vehicle platform. It would be lighter and less costly than current extruded modules due to the reduced material used in the extrusion and ease of manufacturing.

It is also believed to be evident that if rework on a module is required for any reason it could be done before the inflator was installed. In the event that a module was to be scrapped, it would reduce cost by not having an inflator in place. If the inflator was in place, it could be removed and used in another module without any loss of integrity.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. In an automotive airbag assembly comprising a trough-shaped reaction canister including a floor and first and second sidewalls; first and second end plates closing the ends of said canister, an inflator chamber carried by said canister, means for passing gases generated from within said inflator chamber into said canister, and an airbag within said canister adapted to be inflated by gases from said inflator chamber, the improvement comprising:

at least one channel integral with, and extending along the length, of said canister; and at least one wing integral with, and extending along the length, of said inflator chamber, said wing being insertable in said channel for sliding therein to a desired operative position and retained therein by staking of said channel to said wing.

2. The improvement of claim 1 wherein said channel is staked to said wing by compression of said channel to form a sunken space in at least one wall of said channel that produces a projection of said wall that compresses said inflator wing.

3. The improvement of claim 2 wherein said canister carries at least two parallel channels and said inflator chamber carries at least two parallel wings.

4. The improvement of claim 3 wherein said canister and said inflator chamber are extruded.

5. The improvement of claim 3 wherein said channels of said canister are substantially rectangular recesses formed in said canister on opposite sides of and beneath said floor.

6. The improvement of claim 5 wherein said wings are substantially rectangular projections that can slide within said recesses.

7. The improvement of claim 6 wherein said inflator chamber is tubular in shape and has both ends thereof closed by a roll crimp.

8. An automotive airbag module assembly comprising:

a trough-shaped reaction canister including a floor having perforations therein and including first and second sidewalls, each of said sidewalls defining a channel beneath said floor extending the length of said canister, said floor having a substantially semicircular portion that extends uniformly into the space between said sidewalls, first and second end plates closing the ends of said canister, a substantially cylindrical inflator chamber having vent holes and including first and second projections thereon that are insertable, respectively, into said channels, wherein said inflator chamber is spaced from said semicircular portion of said canister floor to form a plenum chamber intermediate said vent holes and said perforations, with the ends of said plenum chamber being closed by said end plates, said plenum chamber comprising means for passing gases generated from within said inflator chamber into said canister, and an airbag within said canister adapted to be inflated by gases from said inflator chamber.

9. The assembly of claim 8, wherein said first and second projections are inserted into said channels and when so inserted said projections do not extend beyond the ends of said canister.

10. The assembly of claim 9 wherein said canister defines fastening means in each of the ends of each of said sidewalls, and wherein each of said end plates includes means operative to cooperate with said fastening means for securing said end plates to said canister.

11. The assembly of claim 10 wherein said fastening means comprises screw threaded holes in each end of each of said sidewalls, and wherein said means operative to cooperate with said fastening means comprises a screw threaded into each of said screw threaded holes.

12. The assembly of claim 11 wherein a screw threaded hole is provided in each of the ends of said sidewalls that is adjacent the end of a channel.

13. The assembly of claim 12 wherein a screw threaded hole is provided at each end of said sidewalls at a position that is remote from the end of a channel, whereby a total of only eight screws is required to assemble said airbag assembly, four screws at each end of said canister.

14. An automotive airbag module assembly comprising:

a trough-shaped reaction canister including a floor having perforations therein and including first and second sidewalls, each of said sidewalls defining a channel beneath said floor extending the length of said canister, said floor having a substantially semicircular portion that extends uniformly into the space between said sidewalls, first and second end plates closing the ends of said canister, a substantially cylindrical inflator chamber having vent holes and including first and second projections thereon that are insertable, respectively, into said channels, wherein said inflator chamber is spaced from said semicircular portion of said canister floor to form a plenum chamber intermediate said vent holes and said perforations, with the ends of said plenum chamber being closed by said end plates, said plenum chamber comprising means for passing gases generated from within said inflator chamber into said canister, and an airbag within said canister adapted to be inflated by gases from said inflator chamber, wherein, in the event that a module is needed that is longer than said inflator chamber, said substantially cylindrical inflator chamber includes an integral semicircular flange that fills the gap between the end of the inflator chamber and the respective canister end plate, with the adjacent end of said plenum chamber being sealed by said semicircular flange.

15. The assembly of claim 8 wherein said perforations in said floor of said canister comprise three large gas exit passages of substantially the same size that are uniformly spaced along the length of said floor.

16. The assembly of claim 8 wherein said perforations in said floor of said canister comprise a multiplicity of uniformly spaced gas exit vent holes.

17. An automotive airbag assembly comprising:

an extruded trough-shaped reaction canister including a floor and first and second sidewalls, each of said sidewalls defining a substantially rectangular channel extending the length of said canister beneath said floor; and an extruded inflator chamber having substantially rectangular first and second projections thereon insertable, respectively, into said channels and staked therein.

* * * * *

UNITED STATES PATENT AND TRADEMARK OFFICE
CERTIFICATE OF CORRECTION

PATENT NO. : 5,566,973
DATED : 22 October 1996
INVENTOR(S) : David J. Green, Donald R. Lauritzen, S. Mark Bunker and Larry D. Rose It is certified that error appears in the above-indentified patent and that said Letters Patent is hereby corrected as shown below:

At column 2, lines 61 and 62, "showing-porting or vent holes" should be
--showing porting or vent holes--.

Signed and Sealed this

Sixteenth Day of September, 1997

Attest:

BRUCE LEHMAN

Attesting Officer

Commissioner of Patents and Trademarks